United States Patent
Sasaki et al.

(10) Patent No.: US 6,906,816 B1
(45) Date of Patent: Jun. 14, 2005

(54) PRINTER AND PRINTING METHOD

(75) Inventors: Hidemi Sasaki, Saitama (JP); Koichi Hirasawa, Saitama (JP); Nobuo Katsuma, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/434,121

(22) Filed: Nov. 5, 1999

(30) Foreign Application Priority Data

Nov. 6, 1998  (JP) .......................................... 10-316679

(51) Int. Cl.⁷ .............................................. G06F 15/00
(52) U.S. Cl. .................... 358/1.15; 358/1.12; 358/1.13; 358/1.18
(58) Field of Search ................................ 358/1.1, 1.12, 358/1.13, 1.14, 1.15, 1.18, 448, 1.11, 1.16, 1.17, 1.5

(56) References Cited

U.S. PATENT DOCUMENTS

| | | | | |
|---|---|---|---|---|
| 5,110,106 A | * | 5/1992 | Matsumura et al. | 271/9.06 |
| 5,208,902 A | * | 5/1993 | Kumon | 358/1.17 |
| 5,572,291 A | * | 11/1996 | Moriguchi et al. | 399/390 |
| 5,642,147 A | * | 6/1997 | Yamashita et al. | 347/171 |
| 5,870,114 A | * | 2/1999 | Numata et al. | 347/16 |
| 6,050,666 A | * | 4/2000 | Yeoh et al. | 347/16 |
| 6,079,807 A | * | 6/2000 | Lindstrom et al. | 347/16 |

* cited by examiner

Primary Examiner—Mark Wallerson
(74) Attorney, Agent, or Firm—Sughrue Mion, PLLC

(57) ABSTRACT

In a printer, recording sheets of a standard type and a 16-frame sticker type are usable. A ROM inputs type information of the recording sheet representing one of the standard type and 16-frame sticker type. A controller designates one of first and second printing modes in accordance with the type information, and prints an image to the recording sheet in accordance with the designated printing mode. The first and second printing modes are preset in association with respectively the standard type and 16-frame sticker type.

11 Claims, 8 Drawing Sheets

PRINTER AND PRINTING METHOD

BACKGROUND OF THE INVENTION

1. Field of the Invention

The present invention relates to a printer and a printing method. More particularly, the present invention relates to a printer and a printing method in which printing modes different between plural types of recording sheets can be correctly designated.

2. Description Related to the Prior Art

A digital camera is widely used today. An image photographed by the digital camera is retrieved and processed by a personal computer, and then is printed by a printer of any of various kinds connected with the personal computer.

Also, image data from the digital camera is directly sent to the printer without the personal computer, and used for printing an image. Furthermore, a video signal can be w retrieved from a video movie camera, and used for printing an image.

In the printer, mechanical indicia or optical indicia are provided on a surface of a tray for a recording sheet for designating a sheet size of the recording sheet. A sensor in the printer detects those indicia. According to the indicia as detected, the sheet size of the recording sheet as set is recognized, and indicated on a display screen. No matter how many sizes of the recording sheet the printer is compatible with, the recording sheet set in the printer is enabled to be used.

However the printer of the prior art is operable only for inhibiting printing at the sheet size different from the sheet size of the recording sheet as set in the printer. There is a 16-frame sticker type of the recording sheet. It is likely that an error occurs in that a single frame is recorded to the entirety of the recording sheet of the 16-frame sticker type. Then the recording sheet is wasted as a result of the error. Furthermore, the sheet size or the type of the recording sheet must be selected manually before printing, because of which handling of the printer is difficult and complex.

SUMMARY OF THE INVENTION

In view of the foregoing problems, an object of the present invention is to provide a printer and a printing method in which printing modes different between plural types of recording sheets can be correctly designated.

In order to achieve the above and other objects and advantages of this invention, a printer is provided, in which plural predetermined types of recording material are usable. An input section inputs type information of the recording material representing one of the plural predetermined types. A controller designates one of plural printing modes in accordance with the type information, and prints an image to the recording material in accordance with the designated printing mode, the plural printing modes being preset in association with respectively the plural predetermined types.

In a preferred embodiment, the input section includes an information recording medium, associated with the recording material, for storing the type information.

The recording material has at least one printing region, the printing region being different in a shape or being positioned differently between the plural predetermined types. The controller processes the image for laying out the image in the printing region in accordance with the designated printing mode.

Furthermore, the printer includes a printer body. A loading slot is formed in the printer body. A sheet supply container is set at the loading slot removably, for containing the recording material, the information recording medium being secured to the sheet supply container. Furthermore, the input section includes a first contact pattern for outputting the type information from the information recording medium. A second contact pattern contacts the first contact pattern in response to setting of the sheet supply container at the loading slot, for sending the type information to the controller.

The first contact pattern is disposed at a front end of the sheet supply container oriented to advance toward the printer body. The second contact pattern comprises a pin-shaped contact member disposed in the loading slot and directed toward the sheet supply container.

The information recording medium is ROM. Furthermore, a circuit board is connected with the ROM and provided with the first contact pattern.

If information input by the input section is different from the type information of the plural predetermined types, the controller generates an alarm signal or inhibits operation of printing.

The printer is connectable with a display device. The display device displays the image being processed, so as to enable checking of a layout state of the image in relation to the printing region, for confirming the designated printing mode.

The plural predetermined types include a standard type and a sticker type.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
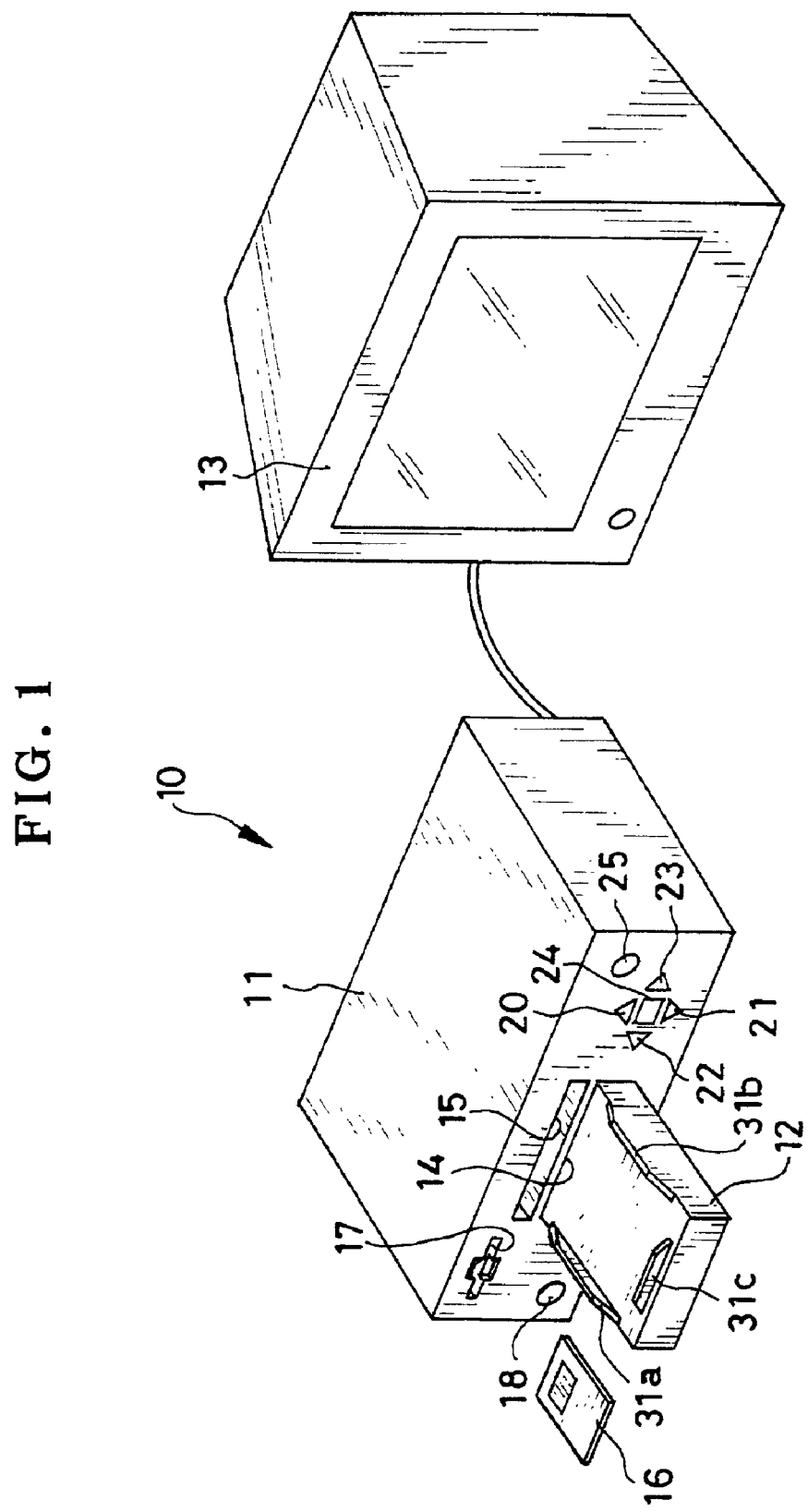
FIG. 1 is a perspective illustrating a color thermal printer and an external display device connected therewith.

In FIG. 1, a color thermal printer 10 according to the present embodiment is illustrated. The thermal printer 10 includes a printer body 11 in a box shape. A sheet supply container 12 or sheet cartridge is mounted in the printer body 11 in a removable manner. An external display device 13 is connected with a printer component of the thermal printer 10, and displays an image to be printed. An example of the display device 13 is a display screen for television.

A loading slot 14 is located in the front face of the printer body 11 for loading of the sheet supply container 12. An exit slot 15 is disposed above the loading slot 14. A smart media insertion slot 17 for a smart media 16 is located to the left of the loading slot 14. An example of the smart media 16 is an IC memory card of a small type. A powering pushbutton 18 is located under the smart media insertion slot 17.

Four cursor keys 20, 21, 22 and 23 are disposed in the sheet supply container 12 to the right of the loading slot 14. An enter key 24 is surrounded by the cursor keys 20–23. A print key 25 is disposed above the cursor keys 20–23. The cursor keys 20–23 are depressible for moving a cursor on the display device 13 in respective directions which are upward, downward, rightward and leftward. The enter key 24 is used for entry of data, namely for confirming a frame, the number of prints and the like designated by use of the cursor. The print key 25 is operated after designation in each printing mode, to start printing.

Figure 2:
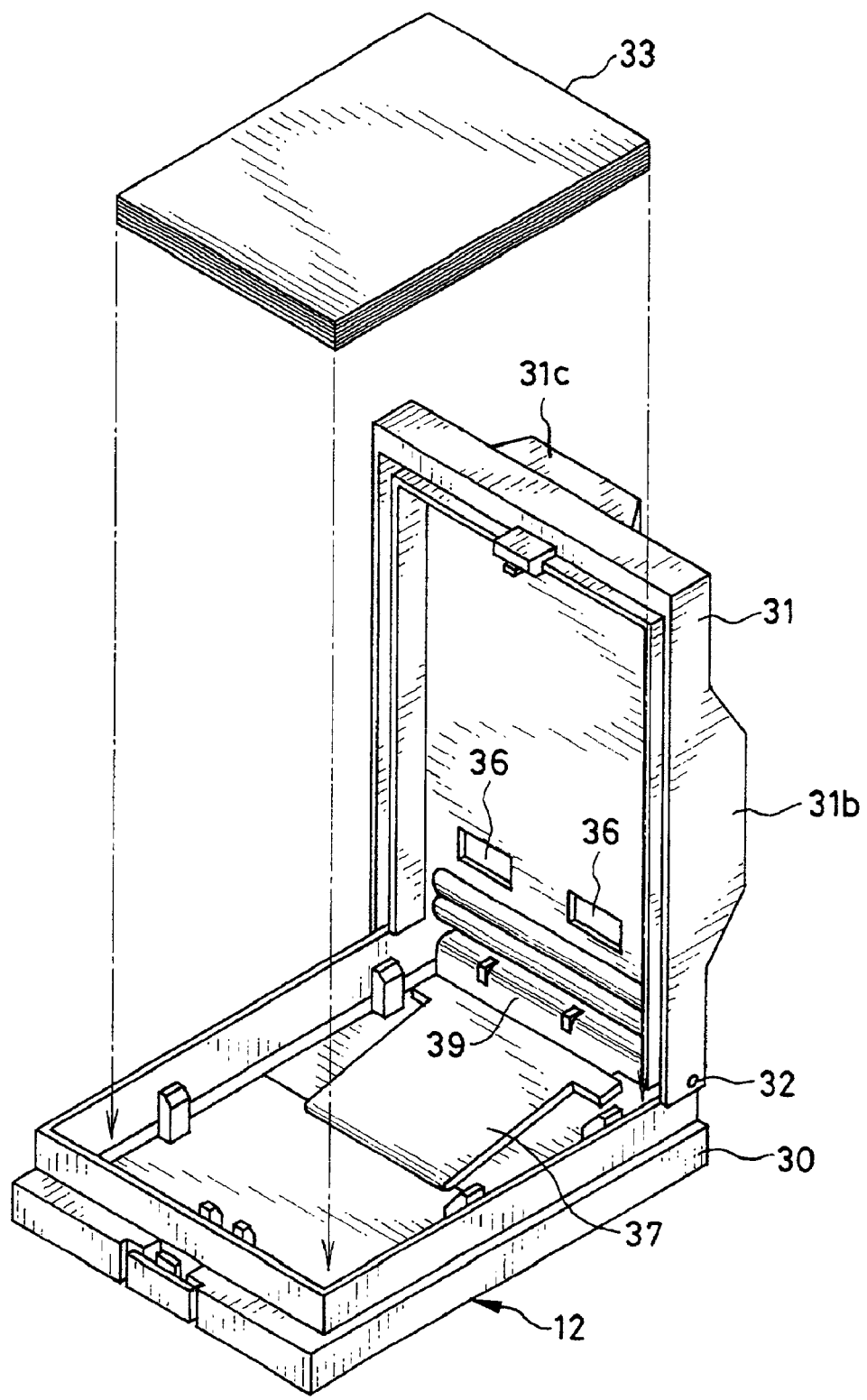
FIG. 2 is a perspective illustrating a sheet supply container with a stack of recording sheets.

In FIG. 2, the sheet supply container 12 is constituted by a container body 30 and a lid 31. The container body 30 has a thin box shape of which an upper portion is open. The lid 31 is mounted on the container body 30 by use of a pivot 32 in an openable manner. A standard type of recording sheets 33 are stacked, and contained inside the container body 30 while the lid 31 is open. In FIG. 1, there are paper guide ridges 31a, 31b and 31c disposed along side lines of the lid 31 to project upwards. The recording sheet 33, when ejected through the exit slot 15 after being subjected to recording, is guided by the paper guide ridges 31a–31c, and kept from dropping down in the lid 31.

Figure 3:
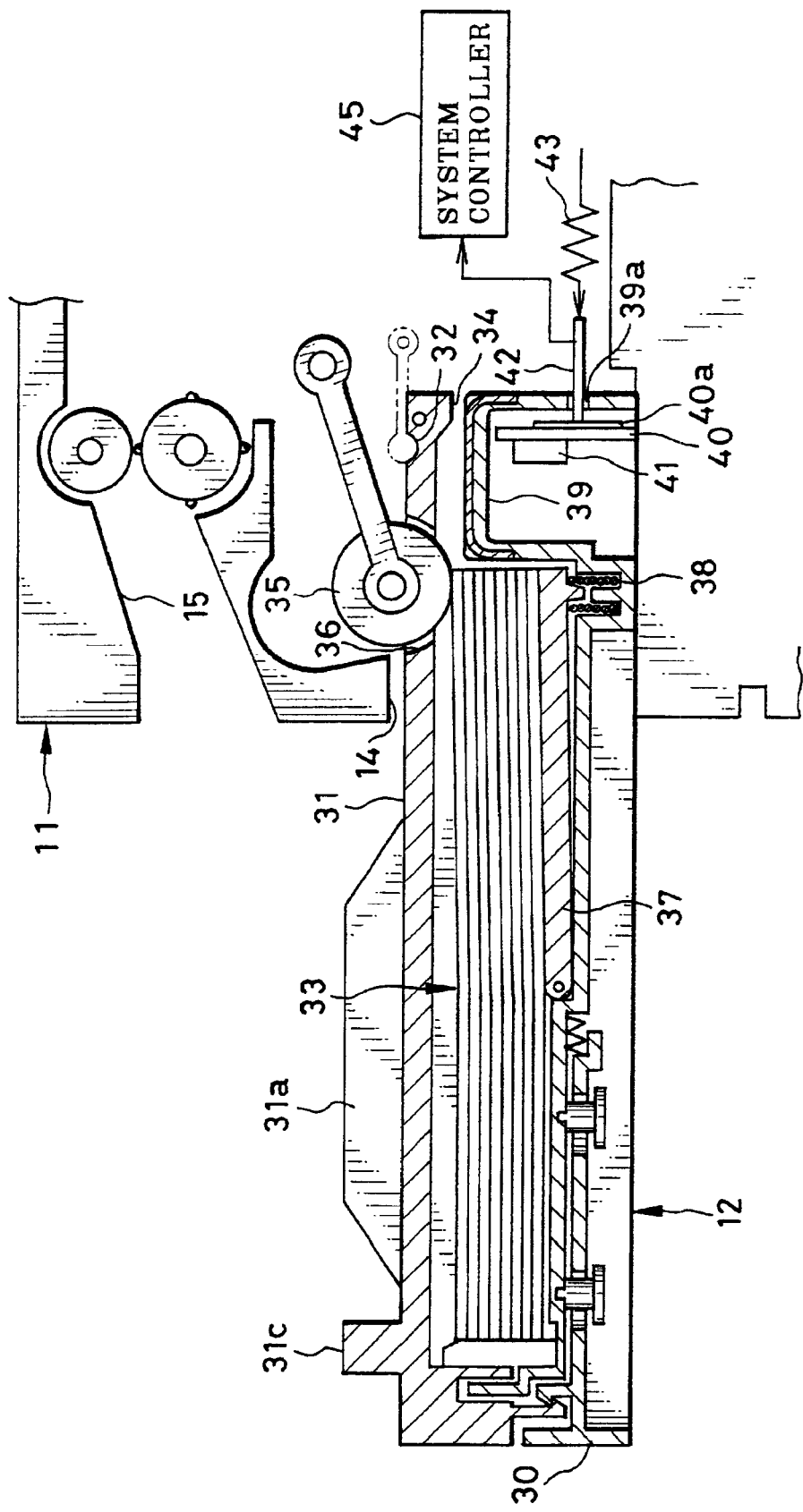
FIG. 3 is a vertical section illustrating the sheet supply container at a loading slot of the printer.

In FIG. 3, a sheet supply slot 34 is defined as a gap between the container body 30 and the lid 31 in a position near to the pivot 32. Roller openings 36 are formed in the lid 31 for insertion of portions of a supply roller 35. A movable lower plate 37 is disposed in the container body 30, and is biased by a coil spring 38 to press the recording sheets 33 against the supply roller 35. A sheet separator 39 is disposed on the container body 30 under the sheet supply slot 34.

A printed circuit board 40 is disposed in a space inside the sheet separator 39. A ROM (read only memory) 41 or an information recording medium in an input section is connected with the printed circuit board 40, and stores type information of the recording sheets 33 contained in the container body 30. The type information represents a size and a type of the recording sheets 33. A first contact pattern 40a in the input section is included in the printed circuit board 40, and located in an accessible manner through an opening 39a which is formed in the sheet separator 39.

A pin-shaped contact member 42 as second contact pattern in the input section is disposed in the printer body 11 to project toward a position of the contact pattern 40a. A coil spring 43 biases the contact member 42 in the projecting direction. When the sheet supply container 12 is set in a sheet supply position, the contact member 42 contacts the contact pattern 40a. Therefore, a system controller 45 incorporated in the printer body 11 becomes connected with ROM 41.

Figure 4:
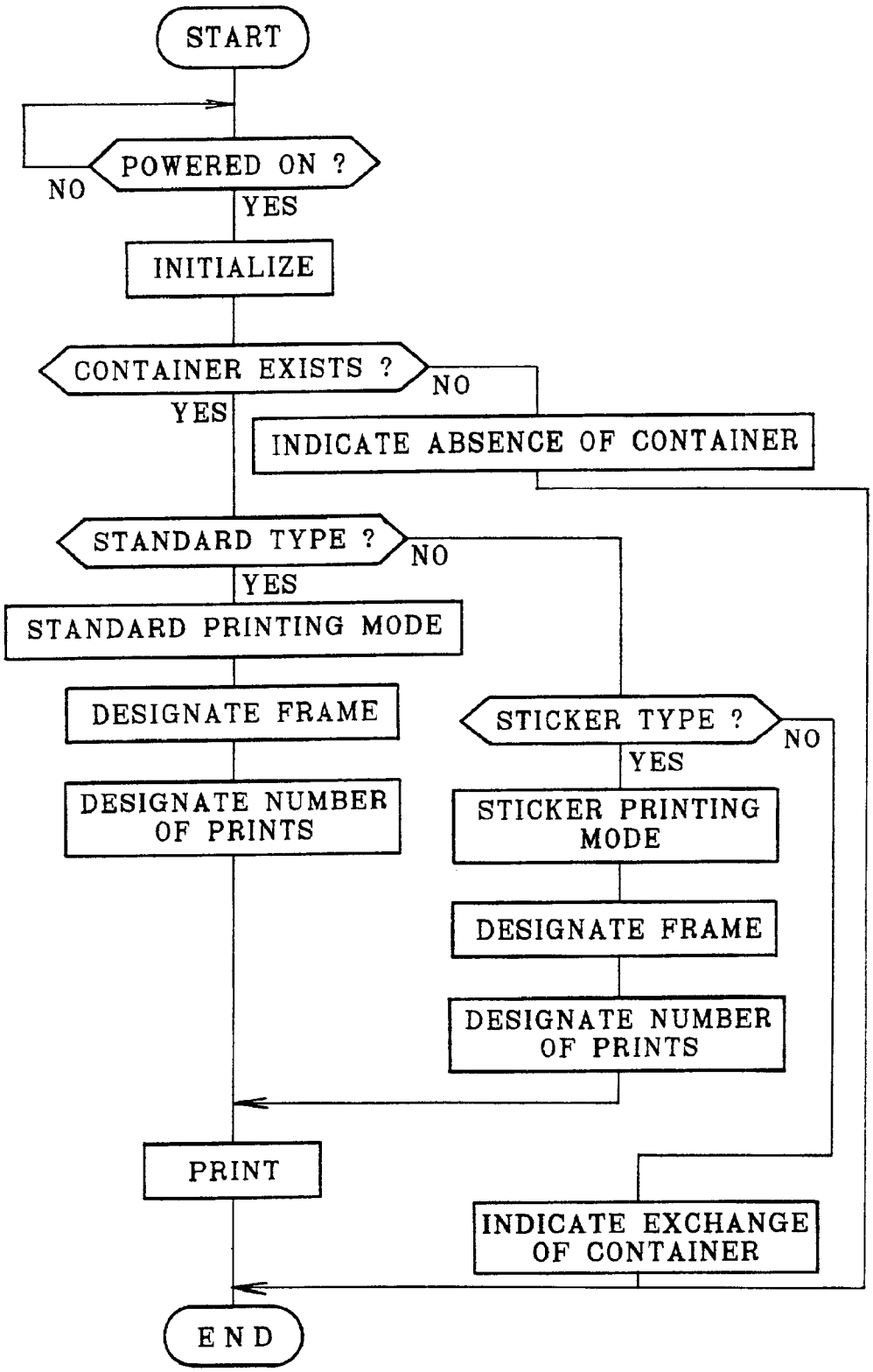
FIG. 4 is a flow chart illustrating operation of the printer.

The system controller 45 controls various components of the printer body 11 and effects printing operation according to a frame stored in the smart media 16. In FIG. 4, a flow of printing in the system controller 45 is depicted. When the printer is powered on, the various components are initialized. Then the loading slot 14 is automatically checked for existence of the sheet supply container 12 in the loading slot 14. This checking is by use of a container detecting sensor. However possibility and impossibility in reading of data from ROM 41 may be utilized for checking the setting of the sheet supply container 12.

If no sheet supply container 12 is set, the display device 13 is caused to indicate absence of the sheet supply container 12 and promote a user to set the sheet supply container 12. After setting of the sheet supply container 12, data from ROM 41 is evaluated. If the sheet supply container 12 is for a standard type of the recording sheets, a standard printing mode is designated. If the sheet supply container 12 is for a 16-frame sticker type of the recording sheets, a 16-frame sticker printing mode is designated. If no type information is obtained from ROM 41, a message of requiring exchange of the sheet supply container 12 is indicated to provide a user with an alarm signal. Also the printing operation is inhibited at this time.

Figure 5:
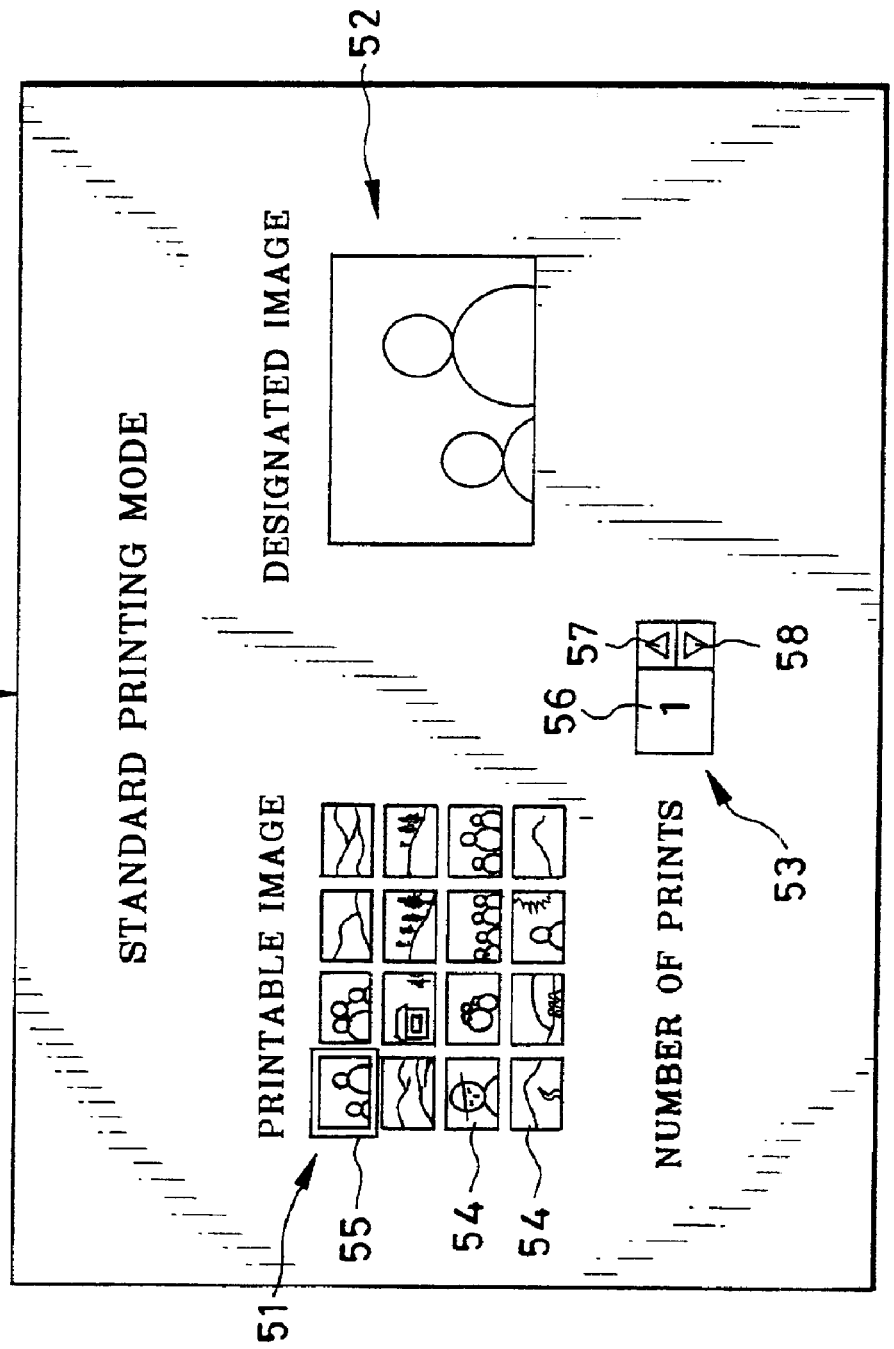
FIG. 5 is an explanatory view in elevation illustrating a standard printing menu.

In the standard printing mode, a standard printing menu 50 of FIG. 5 is displayed in the display device 13. The standard printing menu 50 is constituted by a frame designating region 51, an image indicating region 52 and a number designating region 53. By use of the standard printing menu 50, a frame to be printed is designated, and the number of prints to be produced is input.

The smart media 16 stores respective information of plural frames. Size-reduced frames 54 are indicated in the frame designating region 51. The cursor keys 20–23 are operated for selection among the size-reduced frames 54 to designate one frame. A frame-shaped cursor 55 designates one frame by coloring a portion around the one frame in a blue color or any color different from the background color of the display screen. If the cursor key 23 is depressed, the frame-shaped cursor 55 is moved toward the right. If the cursor keys 20–22 are depressed, the frame-shaped cursor 55 is similarly moved in each direction associated with a depressed one of the cursor keys 20–22. When the frame-shaped cursor 55 becomes located at a desired one of the size-reduced frames 54, the enter key 24 is depressed to determine the selection of the frame pointed by the frame-shaped cursor 55.

Then the number of the prints is input. A print number 56 is "1" as a default value. If the print number 56 is desired to be greater, a triangular pushbutton 57 in an upward direction is pushed to change the print number 56 to 2, 3 or more. If the print number 56 is desired to be greater, a triangular pushbutton 58 in a downward direction is pushed. Then the print key 25 is operated to produce a print in a manner of normal printing. A single frame is printed to the entirety of the printing region of the recording sheet 33.

Figure 6:
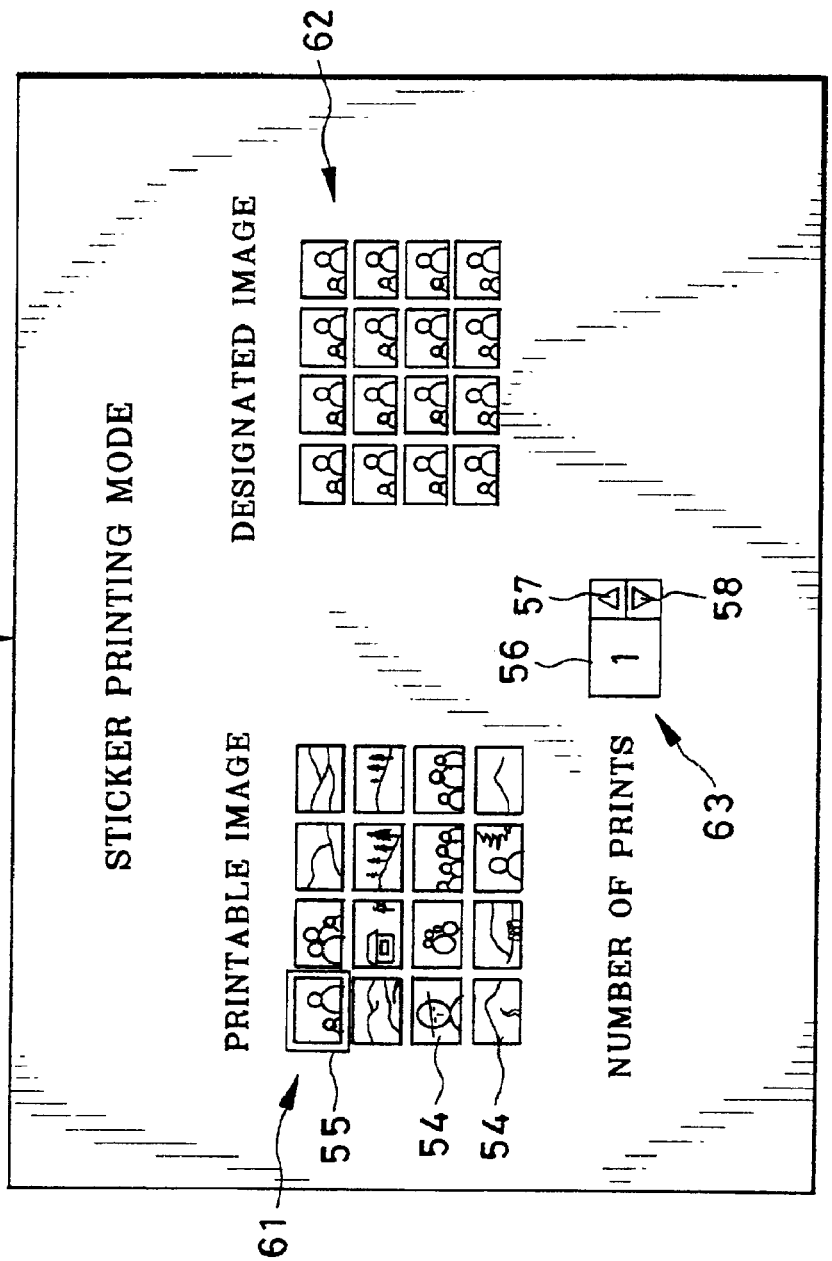
FIG. 6 is an explanatory view in elevation illustrating a sticker printing menu.

In the 16-frame sticker printing mode, a sticker printing menu 60 is displayed on the display device 13. See FIG. 6. The sticker printing menu 60 is constituted by a frame designating region 61, an image indicating region 62 and a number designating region 63. Elements similar to those of FIG. 5 are designated with identical reference numerals. In a manner similar to the standard printing mode, a frame to be printed and the number of prints are designated. The designated frame is indicated in the image indicating region 62.

Thus the standard printing menu 50 or the sticker printing menu 60 is displayed according to the type of the recording sheet 33 in the sheet supply container 12 in response to the setting of the sheet supply container 12 to the loading slot 14. It is possible to avoid using a printing mode not suitable for the type of the recording sheet 33 as contained. It is possible not to select one of the types by manual operation, as the single type is designated automatically.

Figure 7:
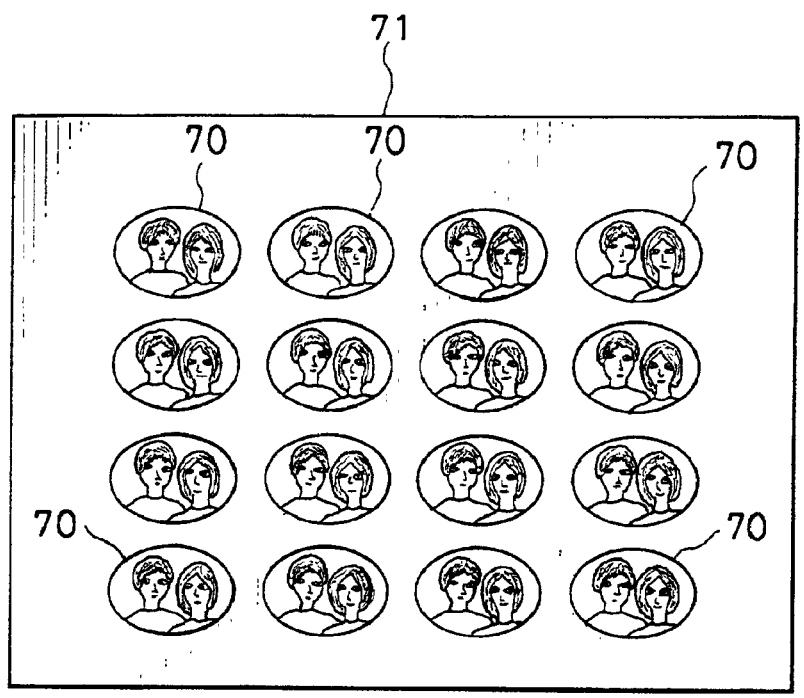
FIG. 7 is an explanatory view in plan illustrating another recording sheet with printing regions in an elliptical shape.
Figure 8:
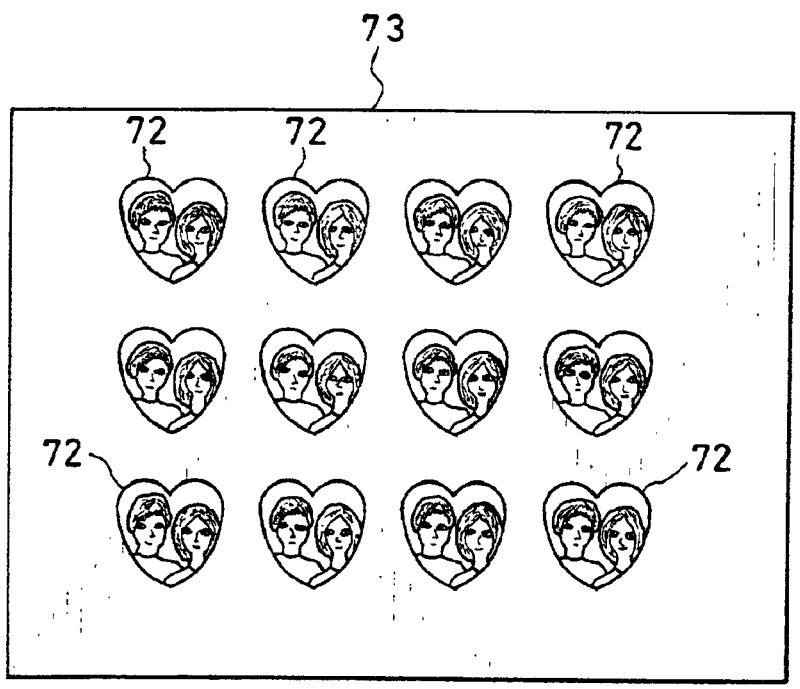
FIG. 8 is an explanatory view in plan illustrating still another recording sheet with printing regions in a heart shape.

In the above embodiment, the 16-frame sticker type of recording sheet is used. However the number of the frames in each recording sheet may be 4, 12, 24 or the like. For the plural sticker types of recording sheets, corresponding kinds of type information are written to ROM 41. The shape of the frames in the recording sheet may be a rectangular quadrilateral. But as illustrated in FIG. 7, it is possible that a sticker type of recording sheet 71 has printing regions 70 defined inside a cutting line in an elliptical shape. In FIG. 8, a heart shape is used for printing regions 72 defined inside a cutting line in a sticker type of recording sheet 73.

Furthermore, a print on which 16 frames in a small size are arranged in a matrix can be produced as a multi-frame print. Additionally, the printer may be so constructed as to designate plural frames and numbers of prints for each of the designated frames. A single recording sheet may be subjected to printing of plural kinds of frames.

Figure 9:
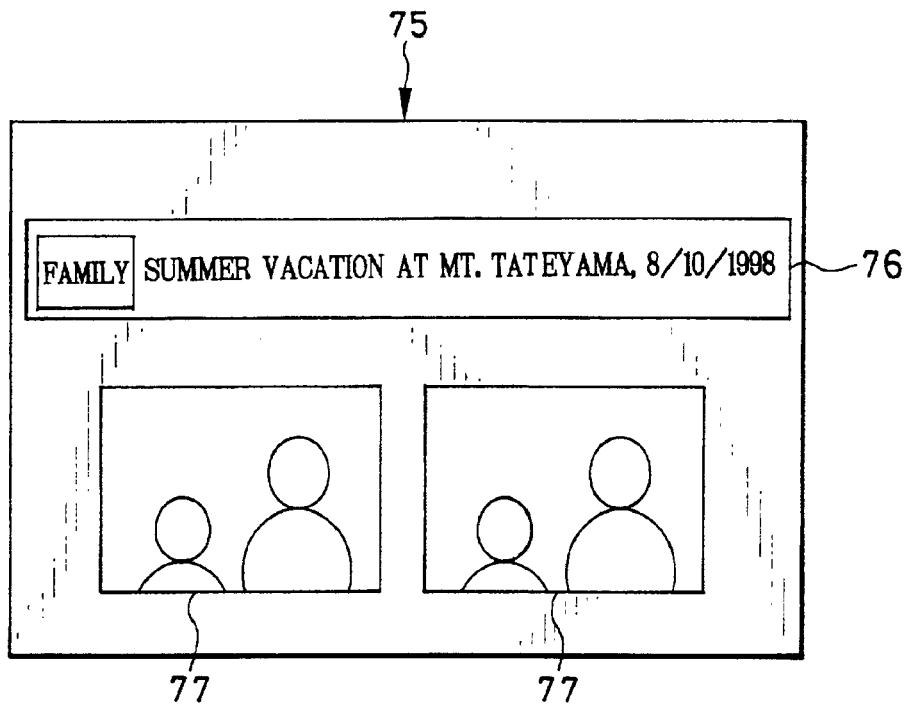
FIG. 9 is an explanatory view in plan illustrating another recording sheet of a specialized sticker type.

Furthermore, a special sticker type of recording sheet may be specialized for various uses, for example attachment to a video cassette of the VHS type or 8-mm type, or to an audio cassette. In FIG. 9, a specialized sticker type of recording sheet 75 for attachment to the video cassette of the VHS type is illustrated. The recording sheet 75 has printing regions 76 and 77 each defined inside a cutting line. The portions of the printing regions 76 and 77 are peeled and attached to suitable portions of the cassette, for example a back face and an end face of the cassette.

Figure 10:
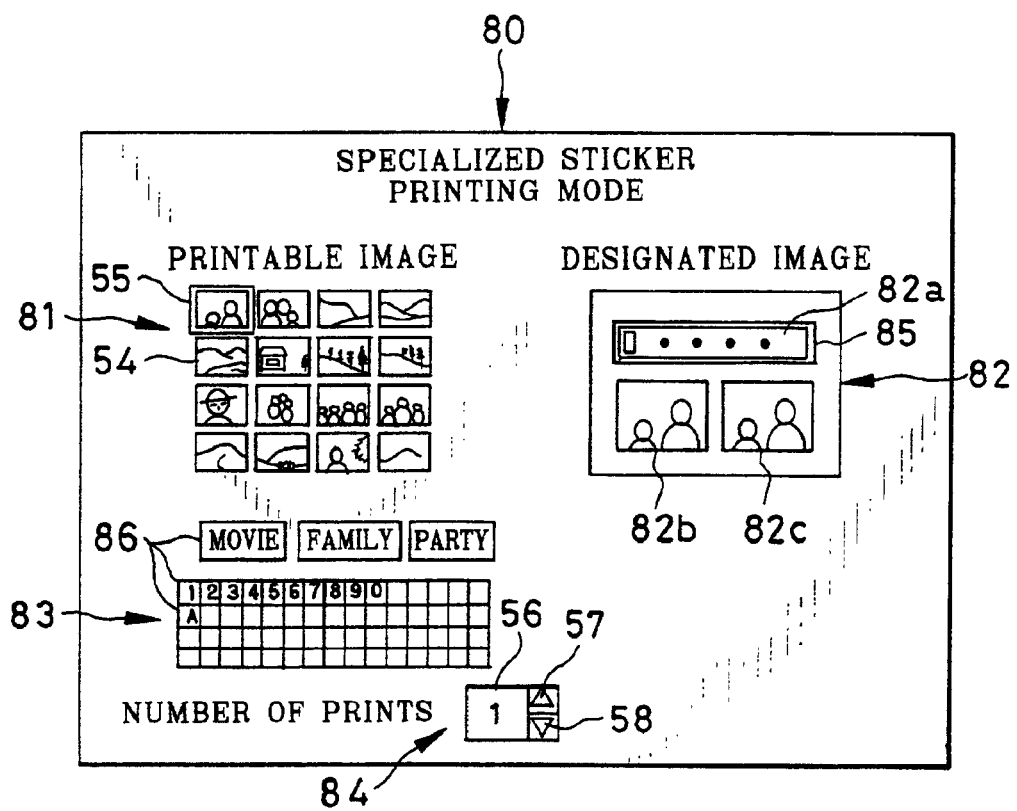
FIG. 10 is an explanatory view in elevation illustrating a specialized sticker printing menu.

In FIG. 10, a specialized sticker printing menu 80 for the recording sheet 75 is illustrated. The specialized sticker printing menu 80 is constituted by a frame designating region 81, an image indicating region 82, a letter inputting region 83 and a number designating region 84. The frame designating region 81 and the number designating region 84 are the same as those included in the standard printing menu 50 or the sticker printing menu 60.

Sticker images 82a, 82b and 82c are displayed in the image indicating region 82. Letters and images are input for the sticker images 82a–82c. At first, a frame-shaped cursor 85 is indicated by coloring the portions around the sticker image 82a in blue color, so as to inform a user of a mode for inputting the frame designating region 81. Then desired ones of keys 86 or segments in the letter inputting region 83 are designated by operating the cursor key and the enter key, to input a caption or the like.

The series of input letters and the designated frame are inserted in the sticker images 82a–82c. Then the print key 25 is depressed to record the sticker images 82a–82c to the recording sheet 75.

Note that the sheet supply container 12 may be a sheet tray, a sheet package or any type of structure for containing or supporting a stack of recording sheets. The sheet package may be set simply in the loading slot 14 of the printer body 11, or else can be set in a tray or a sheet supply container which is settable to the printer body. The above-described ROM is incorporated in the sheet supply tray or package to store type information of the recording sheets as contained. Furthermore, ROM may be EEPROM (electrically erasable programmable read only memory) to which data can be stored electrically and in which data stored therein can be erased electrically.

Also, the type information may be represented by a predetermined pattern of projecting and retracted segments disposed on the container and arranged in a binary manner. For this construction, a printer is provided with a mechanical switch, which is contacted by the pattern to detect the type information. Furthermore, the type information may be represented by a predetermined combination of white and black dots or indicia disposed on the container and arranged in a binary manner. For this construction, a printer is provided with photo sensors, which photoelectrically detect the type information. Also, a bar code may be prerecorded to represent the type information.

Furthermore, the sheet supply container 12 may be provided with a magnetic recording medium for storing the type information. A magnetic head may be located in the loading slot 14 for reading the type information.

In the above embodiments, the type information is input from ROM by use of signal lines for connection of ROM to the system controller. But input keys can be disposed on a front panel of the printer, and operated manually for inputting the type information.

In the above embodiments, the printer is the color thermal printer. However the present invention may be used in a thermal printer of a sublimation type or a thermal transfer type, and also in an ink-jet printer or a printer of a type for use with a silver halide recording material. In the above embodiments, the display device 13 is used in connection with the printer component of the printer. Furthermore, a display unit may be incorporated in a printer.

Furthermore, it is possible to prerecord type information on a rear surface of or near to an edge of recording sheets. A reader can be disposed in the loading slot, and can read the type information from the recording sheets.

In the above embodiments, the loading slot 14 is single. But a printer may be provided with a plurality of loading slots. Thus a plurality of sheet supply containers may be kept inserted in the loading slots at the same time. The printer may be provided with pushbuttons for selection of one of the loading slots.

In the above embodiments, a plurality of sheet supply containers are prepared as selectable attachment of the printer. The number of the sheet supply containers is equal to the number of the preset printing modes. In other words, the number of ROMs 41 is equal to the types represented by the type information stored in ROMs.

However ROM 41 may be a ROM card removably secured to the sheet supply container 12 which can be single. In other words, a plurality of ROM cards may be prepared and may be selectably combined with the single sheet supply container 12.

In the above embodiments, the printing modes are determined for changing the size, the shape and the layout of the frame. However printing modes may be preset for changes in image processing, for example to change density, sharpness or the like. Also, plural printing modes may be preset in consideration of differences of plural recording materials that are different in such characteristics as surface roughness, surface gloss or the like.

In the above embodiments, ROM 41 is connected with the contact member 42 by the printed circuit board 40 with the contact pattern 40a. However ROM 41 may be a ROM card having an array of terminals. The contact member 42 may be replaced by an array of pins as a connector, so that ROM 41 can be connected with the contact member 42 directly without the printed circuit board 40.

Furthermore, it is possible that a receiving plug of a female type may be used in place of the contact member 42. A pin type of connector can be disposed in the sheet supply container 12 in connection with ROM 41, and coupled with the receiving plug upon setting of the sheet supply container 12 in the printer body 11.

Also, a non-contact system of an electromagnetic induction type with a coil may be used for reading the type information from ROM.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A printer in which a plurality of types of recording material are usable, comprising:
   an input section operable to automatically input type information representing one of said types of said recording material, wherein each of said types of said recording material has at least one printing region having a shape or a position which is different than said at least one printing region of other types of said recording material, said type information indicates a size and a type of said recording material, and said input section includes an information recording medium for storing said type information;
   a controller for designating a printing mode in accordance with said type information, and for printing an image to said recording material in accordance with said designated printing mode, said controller processing said image for laying out said image in said printing region in accordance with said designated printing mode;
   a printer body;
   a loading slot formed in said printer body; and
   a sheet supply container, set at said loading slot removably, for containing said recording material, said information recording medium being secured to said sheet supply container;
   wherein said input section further includes:
   a first contact pattern for outputting said type information from said information recording medium; and
   a second contact pattern, connected with said controller, for contacting said first contact pattern in response to setting of said sheet supply container at said loading slot.

2. A printer as defined in claim 1, wherein said first contact pattern is disposed at a front end of said sheet supply container; and
   said second contact pattern comprises a pin-shaped contact member disposed in said loading slot and directed toward said sheet supply container.

3. A printer as defined in claim 1, wherein said information recording medium comprises a read only memory (ROM);
   further comprising a circuit board connected with said ROM and provided with said first contact pattern.

4. A printer as defined in claim 1, wherein in case of lack of reading of said type information from said input section, said controller generates an alarm signal or inhibits operation of printing.

5. A printer as defined in claim 1, wherein said printer is connectable with a display device, said display device displays said image being processed, so as to enable checking of a layout state of said image in relation to said printing region, for confirming said designated printing mode.

6. A printer as defined in claim 1, wherein said types of recording material include a standard type and a sticker type.

7. A printing method in which a plurality of types of recording material are usable, comprising steps of:
   containing a recording material in a sheet supply container settable in a printer, wherein an information recording medium is secured to said sheet supply container;
   connecting said information recording medium with said printer in response to setting of said sheet supply container in said printer;
   automatically inputting type information representing one of said types of said recording material by reading said type information stored in said information recording medium, wherein each of said types of said recording material has at least one printing region having a shape or a position which is different than said at least one printing region of other types of said recording material, and said type information indicates a size and a type of said recording material;
   designating a printing mode in accordance with said type information;
   processing an image for laying out said image in said printing region in accordance with said designated printing mode;
   printing with said printer said image to said recording material in accordance with said designated printing mode.

8. A printing method as defined in claim 7, wherein said information recording medium comprises a read only memory (ROM).

9. A printing method as defined in claim 7, further comprising a step of, in case of lack of reading of said type information from said information recording medium, generating an alarm signal or inhibiting operation of printing.

10. A printing method as defined in claim 7, further comprising steps of:
    displaying said image being processed; and
    checking a layout state of said image in relation to said printing region, for confirming said designated printing mode.

11. A printing method as defined in claim 7, wherein said types of said recording material include a standard type and a sticker type.

* * * * *